Patented Aug. 15, 1950

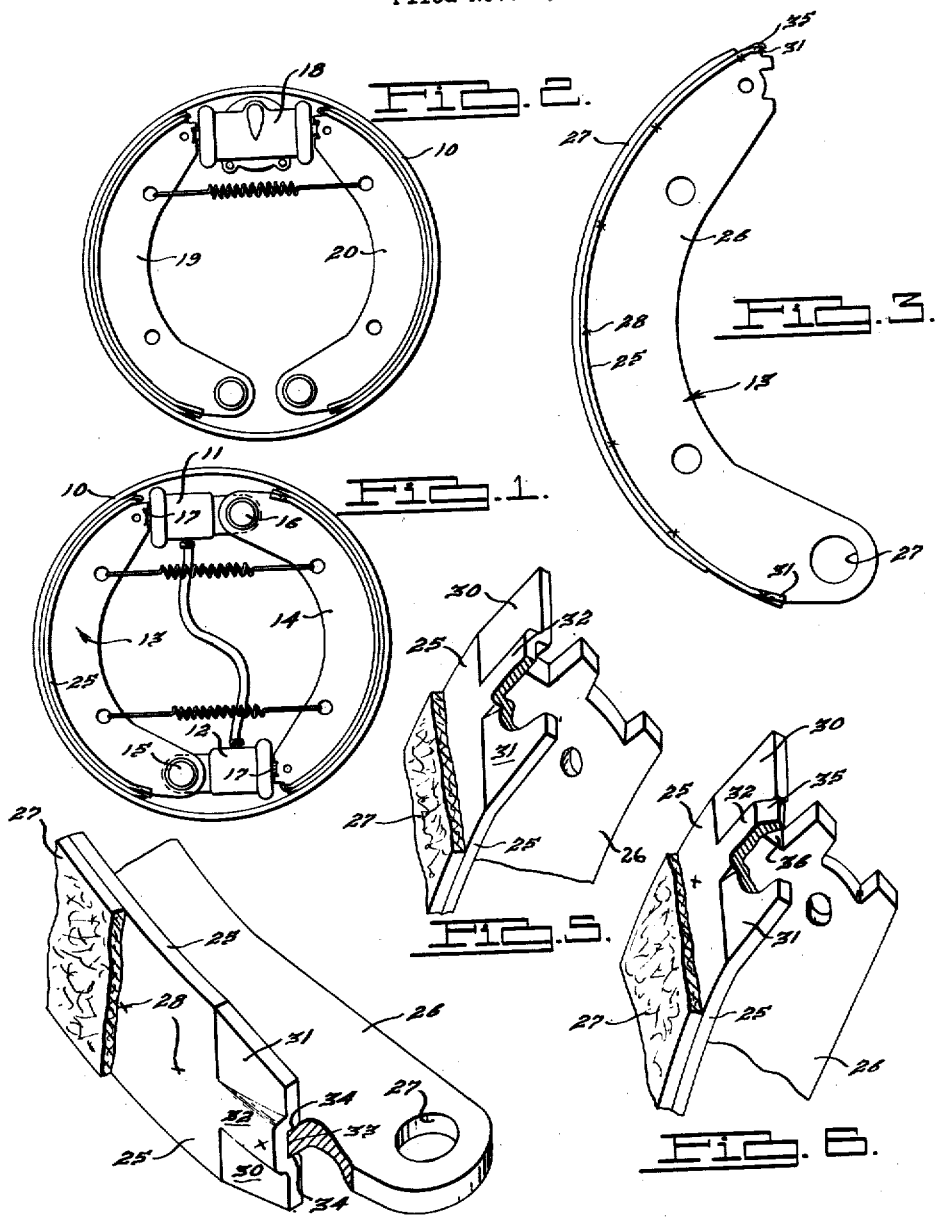

2,518,828

UNITED STATES PATENT OFFICE 2,518,828

BRAKE SHOE

Robert F. Smith, Detroit, Mich., assignor to Chrysler Corporation, Highland Park, Mich., a corporation of Delaware Application November 9, 1946, Serial No. 708,867

2 Claims. (Cl. 188—250)

This invention relates to brake shoes and more particularly to means to facilitate the assembly of the brake shoe and to lock the component parts against relative movement during operation of the brake.

The practice of fabricating brake shoes by the assembly of an outer band with an arcuate stiffening web has been employed by the industry. It is an object of this invention to deform a band so that cooperating portions of the band and web will serve as a locking means to locate the parts in their proper relative positions for welding and then serve as load carrying elements during operation of the brake.

It is a further object of the invention to peen a portion of the band over an edge of the web so that it will resist movement of the band about the periphery of the web under the influence of the braking torque. The deformation supplements welding of the components as a holding means.

In the usual self-energizing brake the brake shoe is pivoted so that the friction of the shoe on a brake band tends to further rotate the shoe outwardly and increase the braking pressure. Two conventional types of self-energizing brakes are illustrated herein to show the interchangeability of the novel brake shoe.

In the drawings:

Fig. 1 is an elevation of common construction of an automotive front wheel brake fitted with my novel brake shoes;

Fig. 2 is an elevation of a common construction of an automotive rear brake fitted with my novel brake shoes;

Fig. 3 is an enlarged elevation of the brake shoes;

Fig. 4 is a perspective view of the lower end of the brake shoe illustrated in Fig. 3;

Fig. 5 is a perspective view of the upper end of the Fig. 3 brake shoe prior to final deformation thereof; and Fig. 6 is a perspective view similar to Fig. 5, but after peening an end portion thereof.

The brake illustrated in Fig. 1 is a conventional self-energizing hydraulic front wheel brake of the internal expanding type. A brake drum 10 is mounted on the vehicle wheel (not shown). A pair of hydraulic actuating cylinders 11 and 12 are mounted on the brake drum at diametrically opposed positions. A pair of brake shoes 13 and 14 are pivotally mounted at 15 and 16 respectively. The free end of each shoe is adapted to be engaged and moved outwardly by a rod 17 which is operatively connected with a brake cylinder. It is evident that when the brake drum is rotating in a counterclockwise direction the free end of each brake shoe will be seized by a frictional engagement with the drum 10 and caused to rotate still further about its pivot point thus increasing the brake pressure and tending to separate the brake band from the web. A modified type of brake is illustrated in Fig. 2 in which a single double-acting brake cylinder 18 is positioned between the free ends of a pair of brake shoes 19 and 20 which are pivotally mounted at 21 and 22. The brake shoe 19 is self-energizing when the vehicle is moving forward and the brake drum rotating in a counterclockwise direction. The brake shoe 20 is self-energizing when the vehicle is moving in reverse and the brake drum is rotating in a clockwise direction. These two types of brakes have been described to illustrate that the brake shoes 13, 14, 19 and 20 are similar and substantially interchangeable and to illustrate that the end of the brake shoe which is remote from its pivotal connection with the brake drum receives a force caused by the friction of the shoe on the drum which tends to move the brake band longitudinally relative to the brake web. Means will be described herein to prevent this separation in the event of welding failures and to assume a part of the load normally taken by the welded connection of the band and web.

An individual brake shoe is illustrated in Fig. 3. An arcuate band 25 is assembled with an arcuate radially extending web 26 and a conventional lining 27 is secured to the band 25 in the usual manner. The web 26 is provided with an opening 27 by means of which the brake shoe will be pivotally mounted. It is common practice to weld a brake band to its web as indicated at 28. Each end of the band is deformed in my novel brake shoe construction so that channel or track portions are created to receive the web. Figs. 4 and 5 illustrate this deformation. The band has an arcuate body portion which terminates in a central extension 32 and a pair of side extensions 30 and 31. All of these extensions are continuations of the body portion. The central extension 32 includes a pair of spaced channel walls 34 which are deformed radially inwardly so that a short channel 33 is created adjacent each end of the brake band. The channel 33 has a width corresponding to the width on the web 26. When the web is assembled with the brake band, portions of the web will be received in the channel 33 and the side walls 34 of the channel will engage the sides of the web to prevent lateral movement of the web relative to the band both prior to and after welding. The side extensions 30 and 31 extend laterally outwardly from the side walls 34 and are coextensive in length therewith.

An additional deformation of the brake band is made on the end of the shoe that is remote from its pivot 27. This is illustrated in Fig. 6. The brake band is sufficiently long so that it extends beyond the end of the web (see Fig. 5). The central extension 32 of the deformed band is peened radially over the end of the web to form a tongue 35 which engages edge 36 of the web and resists longitudinal movement of the band relative to the web. This also serves as a locator for the proper relative position of the parts during welding.

In the operation of the brake the side extensions 30 and 31 prevent relative lateral movement of the parts and the tongue 35 and edge 36 cooperate to prevent relative longitudinal movements of the parts. These deformations also serve as a positive locating means for the parts during the welding thereof. The deformations are preferably all made prior to the welding of the parts for this reason.

The portions 30, 31 and 35 are formed in a band which has an initial straight edge at its extreme end.

I claim:

1. A brake shoe comprising an arcuate band and a web secured thereto and extending radially inwardly from said band, said band having an arcuate body portion terminating in a central extension and a pair of side extensions which are coextensive in length with the central extension and joined throughout their length to said central extension and throughout their width to said body portion, all of said extensions being continuations of said arcuate body portion, said central extension comprising spaced first portions deformed radially inwardly from the arcuate surface of said band to form opposed side walls of a groove extending longitudinally of said band, a second portion extending on the arc of said band between said opposed sidewalls to form a bottom for said groove and an end portion of said central extension bent radially inwardly to form an end wall of said groove, said side extensions extending laterally outwardly from respectively opposite side walls of said groove and said web having a portion thereof located in said groove with its end abutting said end wall.

2. A brake shoe comprising an arcuate band and a web secured thereto and extending radially inwardly from said band, said band having an arcuate body portion terminating in a central extension and a pair of side extensions which are coextensive in length with the central extension and joined throughout their length to said central extension and throughout their width to said body portion, all of said extensions being continuations of said arcuate body portion, said central extension comprising spaced first portions deformed radially inwardly from the arcuate surface of said band to form opposed side walls of a groove extending longitudinally of said band and a second portion extending on the arc of said band between said opposed side walls to form a bottom for said groove, said side extensions extending laterally outwardly from respectively opposite side walls of said groove and said web having a portion thereof located in said groove.

ROBERT F. SMITH.

REFERENCES CITED

The following references are of record in the file of this patent:

UNITED STATES PATENTS

| Number | Name | Date |
|---|---|---|
| 1,656,607 | Pierce | Jan. 17, 1928 |
| 1,743,412 | Waite | Jan. 14, 1930 |
| 1,762,694 | Long et al. | June 10, 1930 |
| 1,826,283 | Mooers | Oct. 6, 1931 |
| 1,924,590 | Babel | Aug. 29, 1933 |
| 2,284,485 | Farr et al. | May 26, 1942 |
| 2,348,499 | Sawtelle | May 9, 1944 |